ALFRED H. ANDERSON
INVENTOR

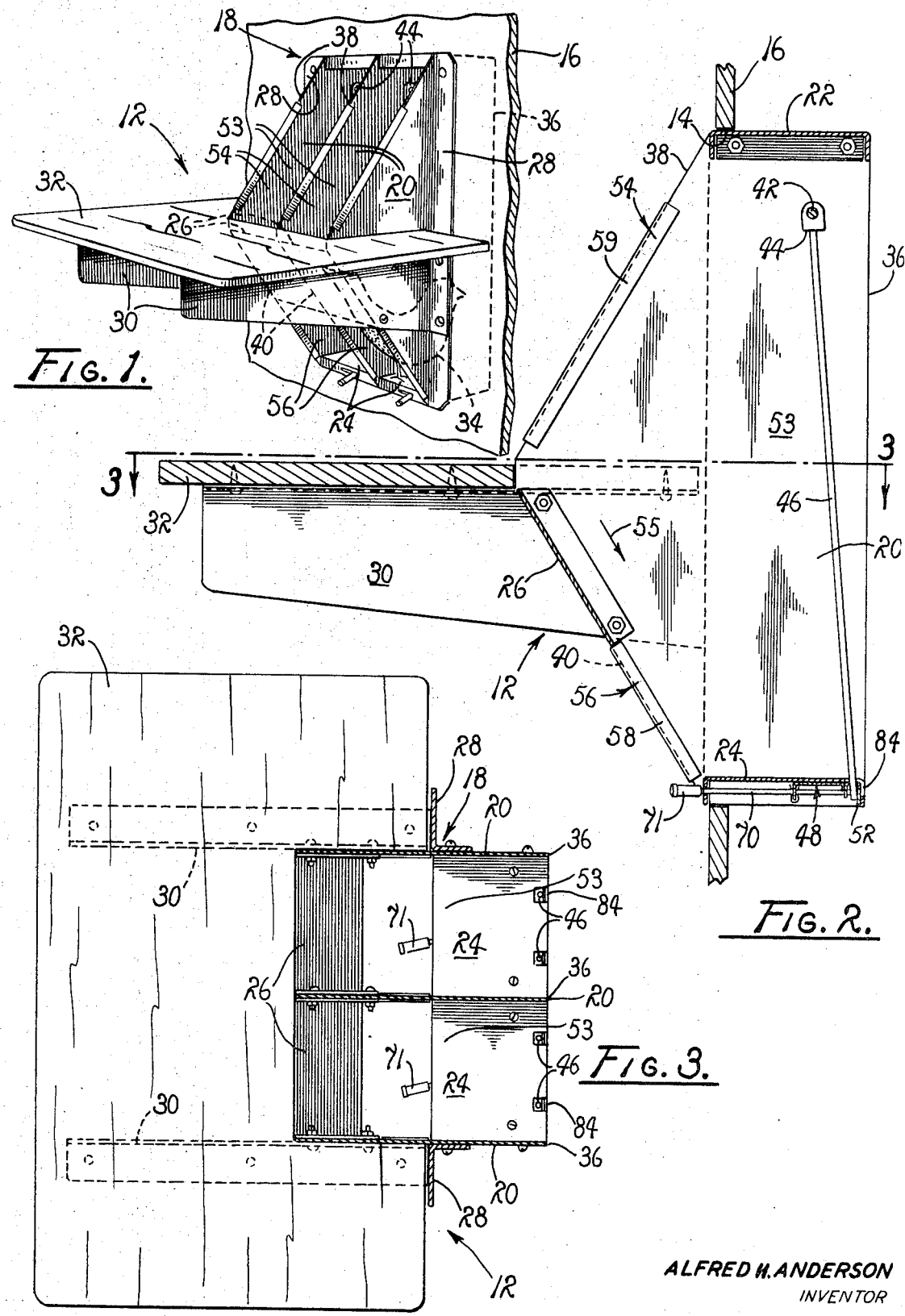

Huebner & Worrel
ATTORNEYS

United States Patent Office 3,557,484
Patented Jan. 26, 1971

---

3,557,484
STALL TRAP FOR HOMING PIGEONS
AND THE LIKE
Alfred H. Anderson, 9300 Nile St.,
Bakersfield, Calif. 93306
Filed Sept. 5, 1968, Ser. No. 757,615
Int. Cl. A01k 69/06; A01m 23/08
U.S. Cl. 43—66                                        7 Claims

ABSTRACT OF THE DISCLOSURE

A stall trap including a frame defining a descending passageway and having spaced sides interconnected by upper and lower spacers, a plurality of pendant members disposed in blocking relation to the lower end portion of the passageway having lower distal ends engageable with the lower spacer and swingable therefrom in response to movement of a pigeon through the passageway, and a latch mounted on the lower spacers selectively serving to latch the pendant members against swinging movement to prevent a pigeon from passing through the passageway and to release the pendant members to accommodate such passage.

BACKGROUND OF THE INVENTION

The present invention relates to a stall trap or entrance controlling means for a bird loft and the like and more particularly to such a device for capturing pigeons or other birds for inspection, banding, debanding or other purposes.

Heretofore, when it was desired to band or deband a pigeon for racing or other purposes, it was necessary to enter the pigeon loft and capture the bird desired. Such entry is disturbing to the birds and the ensuing activity further agitates the occupants of the loft. Such agitation is detrimental to the health of the birds and sometimes results in actual wounding or other physical harm to the birds. Accordingly, entering an occupied loft by a person is undesirable and is to be avoided.

SUMMARY OF THE INVENTION

It is therefore an object of the present invention to provide a stall trap for capturing a homing bird or the like in a manner which does not require entry by a person into a bird loft thereby avoiding disturbing or agitating the occupants thereof.

Another object is to provide improved means for capturing birds taught to enter a loft or the like through a given passageway.

Another object is to provide a device for controlling the ingress to a bird loft which is selectively controlled for barring entrance to the loft.

Another object is to provide a bird loft ingress controlling device which is temporarily adapted to block the movement of a bird a sufficient period of time for easy inspection or capture, yet permits the bird to escape in the event no one is present to effect such inspection or capture.

Another object is to provide a bird capturing device which requires the bird to descend through a chute portion to a support area where the bird customarily pauses momentarily prior to entering the bird loft.

Another object is to provide a stall trap in accordance with the preceding object in which entry can be barred for prolonging the pause period for capture of the bird by hand.

Another object is to provide a bird capturing device of simple and economical construction.

Another object is to provide a bird capturing device simply constructed of parts which are easily and rapidly assembled so as to be shipped knocked down for a saving in shipping costs.

These and other objects and advantages are achieved by a stall trap which includes a metallic frame defining a generally rectangular entrance opening through which the bird is accustomed to pass for entering a bird loft. The frame is made up of spaced vertical sides with spacer structures at the upper and lower edges of the sides. Pendantly mounted between the frame sides are elongated light-weight rods or bobs having lower ends engaged by the lower spacer structure and selectively locked thereagainst by a manipulatable latch mechanism to prevent movement of the rods for barring passage through the entrance opening. The frame sides are extended and joined together to provide a chute down which the bird is adapted to descend to the lower spacer structure, the chute terminating above the structure to provide an outlet through which the bird can escape in the event the entrance opening is barred and no one is present to effect the capture of the bird. Otherwise, the rods are left unlatched so that the bird, after a brief pause on the lower spacer structure, can pass through the entrance opening and effect inward swinging of the rods.

BRIEF DESCRIPTION OF THE DRAWINGS

FIG. 1 is a perspective view of a stall trap embodying the present invention mounted in a bird loft wall together with a bird, shown in broken lines, in the trap.

FIG. 2 is an enlarged vertical section of the trap.

FIG. 3 is a horizontal section taken on line 3—3 of FIG. 2.

DESCRIPTION OF THE EMBODIMENT

Figure 4:
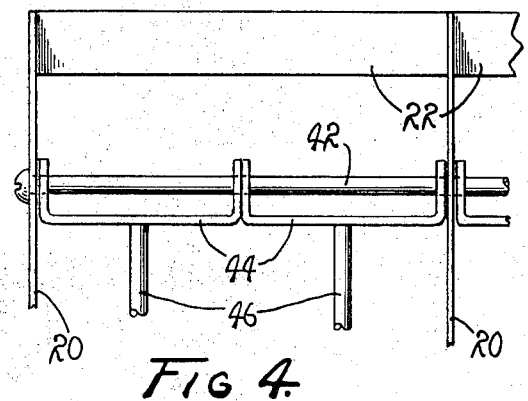
FIG. 4 is a fragmentary detail view showing the pendant mounting of bobs in the trap.

Referring to the drawings, there is shown in FIGS. 1 and 2 a stall trap 12 embodying the principles of the present invention which is disposed within a suitable opening 14 in a bird loft wall 16. The trap 12 includes a frame 18 made up of a plurality of vertically disposed sides 20 of planar form held in spaced parallel relation by upper and lower inverted box-like spacer structures 22 and 24, respectively, and U-shaped spacers 26 therebetween, all bolted or otherwise suitably secured together. As shown in FIG. 3, each of the outermost sides 20 has attached thereto an angle bracket 28 and a support bracket 30, the latter also being attached to the angle bracket at right angles thereto. The brackets 28 are adapted to be secured to the bird loft wall 16 for supporting the frame 18. The support brackets 30 have attached thereto a landing platform 32 upon which birds 34 are adapted to alight prior to entering between a pair of sides 20 for descending to a lower spacer structure 24. Each side 20 has a generally pentagonal configuration with a vertical edge 36 adapted to be disposed inwardly of the bird loft wall 16 and converging edges 38 and 40 extending outwardly from the wall.

Referring also to FIG. 4, passing through the upper portion of each of the sides 20 is a support rod 42 on which are pivotally mounted U-shaped supports 44. Each of the supports 44 has fixed thereto the upper end of a depending rod or bob 46, the lower ends of the bobs being adapted to engage the respective lower spacer structure 24 and to swing therefrom inwardly into the bird loft by passage of a bird through the space between the sides. However, passage of the bird through the space between the sides 20 can be barred by latching the bobs 46 to their spacer structure 24 by a latch mechanism including a mounting bracket 48 mounted on the underside of the associated lower spacer structure 24, the bracket supporting a pivoted control rod or lever 50 operative to move a latch slide 52 of the form shown in FIGS. 5 and 9.

Each pair of sides 20 thus constitutes a stall or compartment 53 with an entrance opening 54 defined mainly by the edges 38 of the sides and the upper edge of the U-shaped spacer 26. The U-shaped spacer 26 and the adjacent portions of the sides 20 define a chute or passageway down which a bird can hop or descend to the lower spacer structure 24 in the direction of the arrow 55, as shown in FIG. 2. An outlet opening 56 from the stall or compartment is defined by the lower edge of the U-shaped spacer 26 and the lower spacer structure 24 and the portions of the edges 40 therebetween. Such edge portions preferably have protective covers 58. Each of the edges 38 is similarly provided with a protective cover 59.

Figure 5:
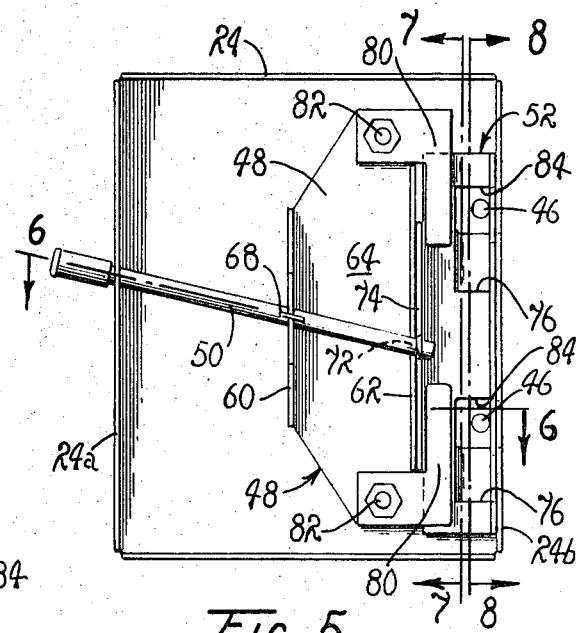
FIG. 5 is a bottom plan view of a lower spacer structure showing a latch mechanism for the lower ends of the bobs.
Figure 6:
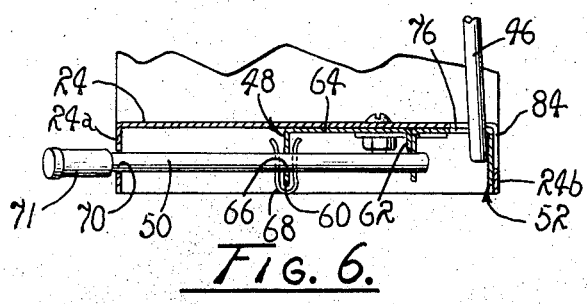
FIG. 6 is a fragmentary vertical section taken on line 6—6 of FIG. 5.
Figure 7:
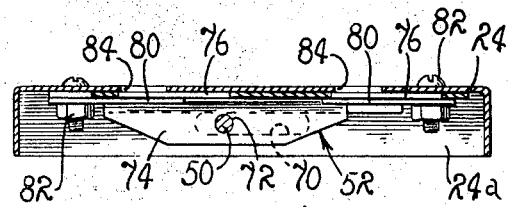
FIG. 7 is a vertical section taken on line 7—7 of FIG. 5.
Figure 8:
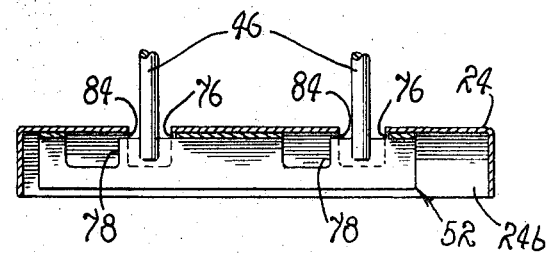
FIG. 8 is a vertical section taken on line 8—8 of FIG. 5.
Figure 9:
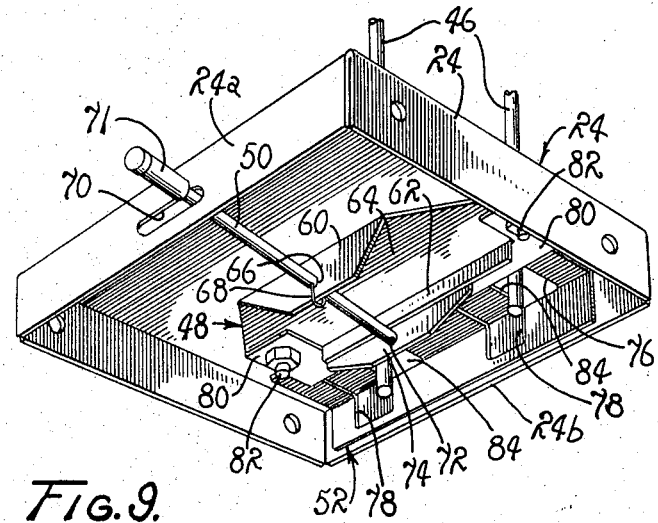
FIG. 9 is a bottom perspective view of the lower spacer structure and latch mechanism of FIG. 5.
Figure 10:
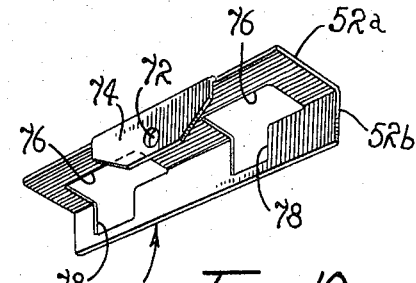
FIG. 10 is a perspective view of a latch slide of the latch mechanism.

Inviting attention to FIGS. 5 through 10, the mounting bracket 48 is formed with a depending leg 60 and a downturned edge 62 interconnected by a web 64, best seen in FIG. 9. Leg 60 is providde with a perforation 66 which is slightly larger than the control rod 50 so that the latter has a sloppy fit therein to provide for limited pivoting or swinging of the rod. As shown in FIG. 6, a U-shaped pin 68 having portions disposed to the sides of the leg 60 and passing through suitable perforations in the rod 50 serves to hold the rod in place. One end of the rod 50 passes through an elongated slot 70 in one side 24a of the spacer structure 24 and has a handle 71, the other end of the rod extending through a slightly oversized perforation 72 in a depending leg 74 forming part of the latch slide 52. As shown in FIG. 10, the remainder of the latch slide has an angle iron configuration, one leg 52a of which is connected to the leg 74 and has formed therein a pair of elongated notches 76 which open into or communicate with a pair of shorter notches 78 formed in the other leg 52b of the latch slide. The latch slide 52 is disposed between the edge 62 of the bracket 48 and a side 24b of the spacer structure 24 for sliding therealong. As shown in FIG. 5, a pair of L-shaped retainers 80 have portions engaging the latch slide 52 for holding the latter in sliding engagement and are secured by a pair of nut and bolt connections 82 which also serve to secure the bracket 48 to the spacer structure 24. Best seen in FIGS. 6 and 8, the top of the spacer structure 24 and the corner of the side 24b are notched, as at 84, in alignment with the lower end of the rods or bobs 46 to permit the latter to swing inwardly of the side 24b when the notches 78 in the latch slide 52 are in registration with the notches 84. Thus, with the notches 78 and 84 in registration, the bobs 46 are free to swing to and from the lower spacer structures 24. However, when the handle 71 is manipulated to slide the latch slide 52 to move the notches 78 out of registration with the notches 84, movement of the bobs 46 out of the notches 84 is prevented.

It will be appreciated that the device of the present invention can be made of any suitable material, for example, of sheet metal or the like, the landing platform 32 preferably being of wood. The various parts can be mass produced for economy of manufacture and shipped unassembled for a saving in shipping space since the parts lend themselves to easy and rapid assembly by nut and bolt connections secured in place with the ordinary screwdriver and pliers.

OPERATION

The operation of the device of the present invention is believed to be clearly apparent and is briefly summarized at this point. Ordinarily, the control rods 50 of the latch mechanisms are disposed to permit free swinging of the bobs 46. Thus, after a bird alights on the landing platform 32, he enters a stall or compartment 53 through the entrance opening 54 and descends in the direction of the arrow 55 to the lower spacer structure 24. The bird pauses momentarily on the spacer structure 24 to gain a footing and then bears against the depending bobs 46 during forward movement to swing them inwardly and enter the bird loft. This procedure for entering the loft becomes habitual by permitting the birds repetitious ingress in this manner.

When it is desired to effect a capture of a bird, the control rods 50 are manipulated to latch the bobs 46 against swinging. Thus, when a bird descends down the chute portion of the stall or compartment, his passage into the bird loft is barred and his pause on the lower spacer structure 24 is prolonged. During this pause a person awaiting the arrival of a bird has an opportunity to extend his hand through the outlet opening 56 to grasp the bird for effecting capture, examination, inspection, banding or debanding. Should the bobs be latched against swinging and the stall not attended by a person, the bird can readily depart through the outlet opening 56 but normally is delayed in doing so while discovering how to escape.

There has thus been provided a stall trap device for easily effecting the capture of birds without the necessity of entering a bird loft, thereby avoiding the undesirable effects of such an entry. Furthermore, the device lends itself to economical manufacture and is readily assembled rapidly using ordinary tools, such as a screwdriver and pliers, so that the device can be shipped unassembled for a saving in shipping space costs.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A stall trap comprising a frame defining a passageway, the frame having spaced sides interconnected by upper and lower spacers, means defining within said lower spacers a plurality of notches, depending members pivotally mounted on the frame between the sides thereof having distal ends engageable with the notches of the lower spacer and swingable therefrom in response to movement of an object in one direction through the passageway, and a latch mechanism carried by the lower spacer for preventing swinging of the members away from the lower spacer and barring passage of an object through the passageway, including an angular member slidably mounted on the lower spacer and having matching notches adapted to be displaced into and out of registration with the notches of the lower spacer for selectively permitting and preventing swinging of the members.

2. The trap of claim 1 in which the frame sides extend beyond the spacers in a direction opposite to said one direction and further comprises an inclined spacer extended between said sides and rigidly coupled thereto to provide a chute portion, the chute portion having a lower end terminating above the lower spacer to provide an outlet for an object passing through the chute portion but barred from passage through the passageway.

3. The trap of claim 2 in which the latch mechanism has a control rod with a manipulating end adjacent to the outlet.

4. The trap of claim 1 in which the sliding of the angular member is controlled by a control lever pivotally mounted on the lower spacer and having a manipulatable end extending therefrom.

5. A stall trap for homing birds including:
(A) a compartmented frame defining an entrance passageway to a bird loft including a plurality of mutually spaced, vertically disposed planar side walls arranged in parallelism;
(B) an inclined spacer extended between said walls near the mid-portions thereof;
(C) a horizontal spacer disposed between lower end portions of said side walls, in spaced relationship with said inclined spacer, defining between said walls bird supporting structure for accommodating passage of birds between said walls;
(D) a support rod extended between said side walls near the upper end portions thereof;
(E) a plurality of pivotally displaceable lightweight rods suspended from said support rod adapted to be engaged by the body of a bird and pivotally displaced away from said bird supporting structure as the bird is passed between said side walls;
(F) stop means disposed adjacent to the lowermost ends of said rods adapted to engage the rods and thereby restrict the rods in pivotal displacement toward said bird supporting structure whereby passage of the bird between said side walls is limited to unidirectional passage; and
(G) a selectively operable latch mechanism disposed adjacent to the lowermost ends of said rods adapted to selectively engage the lowermost ends of the rods for securing the rods against pivotal displacement away from said bird supporting structure, whereby passage of a bird between said side walls selectively is precluded.

6. The trap of claim 5 wherein said stop means includes means defining in said horizontal spacer a plurality of mutually spaced notches and said latch mechanism includes an axially reciprocable angular member having means defining therein a plurality of mutually spaced notches adapted alternately to be displaced into registration with said notches in said spacer.

7. The trap of claim 5 wherein said inclined spacer is dsplaced upwardly from said horizontal spacer for defining therebetween an escape outlet, whereby birds supported by said bird supporting structure are afforded passage between the inclined spacer and the horizontal spacer.

References Cited

UNITED STATES PATENTS

| 1,081,317 | 12/1913 | Mahony | 119—49 |
| 2,842,891 | 7/1958 | Neid | 43—66 |

FOREIGN PATENTS

| 504,145 | 4/1939 | Great Britain | 43—66 |

WARNER H. CAMP, Primary Examiner

U.S. Cl. X.R.

119—49